3,268,607
PREPARATION OF ALKYLATED
AROMATIC COMPOUNDS
George J. Schmitt, Madison, and Daniel E. Nee, Jr., Dover, N.J., assignors to Allied Chemical Corporation, New York, N.Y., a corporation of New York
No Drawing. Filed Dec. 9, 1963, Ser. No. 329,269
9 Claims. (Cl. 260—668)

This invention relates to a novel process for the preparation of 1,3,5-triisopropylbenzene. More particularly this invention relates to a process for the preparation of 1,3,5-triisopropylbenzene wherein benzene or an isopropylbenzene having less than four isopropyl groups substituted on the benzene ring is propylated until a substantial portion of the starting material has been converted to 1,2,4,5-tetraisopropylbenzene and the 1,2,4,5-tetraisopropylbenzene is subsequently dealkylated to 1,3,5-triisopropylbenzene. The 1,3,5-triisopropylbenzene thus produced can be oxidized to its corresponding polycarbinols and polycarboxylic acids.

Catalytic agents such as acid-activated clays have been used in the propylation of benzene to form cumene and the diisopropylbenzenes. By-products, consisting mainly of higher propylated benzenes, are obtained in these operations. The polyisopropylbenzene by-products have been fractionally distilled into their components, but this process is not a practical method of producing 1,3,5-triisopropylbenzene due to the low conversion to the desired material. Applicants have attempted to increase the conversion to 1,3,5-triisopropylbenzene by continuing the propylation until the maximum obtainable concentration of the triisopropylbenzene isomers is present in the reaction mixture, i.e. that point at which the formation of tetraisopropylbenzene begins to diminish the concentration of triisopropylbenzene; however, the product thus obtained contains a substantial proportion of 1,2,4-triisopropylbenzene which may be equal to more than 20% by weight of the 1,3,5-triisopropylbenzene present. Separation of the 1,2,4-isomer from the desired 1,3,5-triisopropylbenzene is difficult and expensive since there is little difference in their boiling points.

It is therefore an object of the present invention to provide an improved method of preparing 1,3,5-triisopropylbenzene.

Another object of the present invention is to provide a method of producing 1,3,5-triisopropylbenzene wherein relatively high conversion to this isomer is obtained, and this isomer can be readily recovered in relatively high purity.

According to yet another object of the invention 1,2,4,5-tetraisopropylbenzene alone or admixed with 1,3,5-triisopropylbenzene is contacted with benzene or isopropylbenzene of lower level of propylation than triisopropylbenzene to form largely 1,3,5-triisopropylbenzene by transpropylation.

Additional objects and advantages of the invention will become apparent from the following detailed description thereof.

In accordance with the present invention, propylene is contacted with benzene and/or one or more of the isopropylbenzenes of lower degree of substitution than tetraisopropylbenzene i.e., cumene, a diisopropylbenzene, and/or a triisopropylbenzene in the presence of an acid-activated clay and in liquid phase at a temperature of 80°–160° C., and additional propylene is supplied in the resulting reaction mixture and the above catalyst and temperature conditions are maintained until the resulting liquid product mixture contains a substantial proportion of both 1,3,5-triisopropylbenzene and 1,2,4,5-tetraisopropylbenzene. The liquid mixture is then cooled to precipitate solid 1,2,4,5-tetraisopropylbenzene which solid is then separated from the components which remain liquid. The tetraisopropylbenzene is then converted to relatively pure 1,3,5-triisopropylbenzene by contacting it in liquid phase with benzene, cumene, diisopropylbenzene, or mixture thereof in the presence of an acid-activated clay catalyst at a temperature of about 110°–170° C., whereby transpropylation takes place.

In order to obtain an alkylated product containing a high percentage of triisopropylbenzene and tetraisopropylbenzene using our catalyst and temperature conditions, at least 3 mols of propylene must be reacted for each mol of benzene, and at least 2 mols of propylene must be reacted for each mol of cumene, and at least one mol propylene to each mol of diisopropylbenzene i.e. at least the stoichiometric amount of propylene must be reacted for forming triisopropylbenzene from the lower isopropylbenzene or benzene starting material. As the propylene supplied is consumed by reaction with the starting material, increasingly propylated products are produced in the reaction mixture. The alkylation process is conducted at a temperature in the range of about 80°–160° C., with optimum results being obtained between 105°–140° C. Above about 160° C. side reactions occur, such as the cracking of the lighter isopropylbenezene, and below about 80° C. the reaction is unduly slow.

According to one aspect of the invention, we found that the 1,2,4-isomer can be propylated to 1,2,4,5-tetraisopropylbenzene at a considerably higher rate than the 1,3,5-isomer. Therefore, as the propylation of the mixture of triisopropylbenzenes proceeds, the mixture containing both isomers can be substantially depleted in the 1,2,4-isomer with only slight depletion of the mixture in the desired 1,3,5-isomer.

Thus at a point when substantially less than the stoichiometric ratio of propylene for forming triisopropylbenzene has been reacted with benzene or other starting material, the reaction mixture contains the two triisopropylbenzene isomers, diisopropylbenzene, and perhaps a little tetraisopropylbenzene. In accordance with our invention, we convert much of the 1,2,4-triisopropylbenzene thus formed into 1,2,4,5-tetraisopropylbenzene by bringing at least the stoichiometric proportion of propylene for formation of triisopropylbenzene into reaction with the starting material. To obtain maximum conversion of the starting material to the desired 1,3,5-triisopropyl-and tetraisopropylbenzenes we maintain our reaction conditions until the isopropylbenzenes lower than triisopropylbenzene have been substantially all consumed in further propylation and the reaction mixture predominates in triisopropylbenzenes and/or tetraisopropylbenzene. At this stage, we find that the triisopropylbenzene product is very largely the 1,3,5-isomer. A preferred intermediate product will contain about 40–50 percent by weight of each of 1,3,5-triisopropylbenzene and 1,2,4,5-tetraisopropylbenzene.

According to another new and unexpected feature of the invention, 1,2,4,5-tetraisopropylbenzene, when contacted in the presence of an acid-activated clay catalyst with benzene, cumene, diisopropylbenzenes, or mixture thereof, undergoes not simply a transpropylation with the lower isopropylbenzenes but also a rearrangement of the isopropyl groups whereby the desired 1,3,5-triisopropylbenzene is obtained in great predominance over the 1,2,4-isomer. By carrying out this step without addition of propylene the production of 1,2,4-isomer is held to a minimum. The exact mechanism of this transpropylation and rearrangement is not known to us. We find that optimum yields of the 1,3,5-triisopropylbenzene can be obtained when this transalkylation is conducted between 110° and 170° C.

The discovery that 1,2,4,5-tetraisopropylbenzene undergoes a rearrangement in its transpropylation also makes the conversion of 1,2,4-triisopropylbenzene alone into 1,3,5-triisopropylbenzene possible by an alkylation-transalkylation sequence.

The propylene reactant may be either propylene itself or a mixture of propylene with other gases which do not interfere with the reaction. Mixtures of propylene and non-interfering gases may be preferred over pure propylene in commecial operations because of their lower cost. Typical of such low cost gaseous mixtures are readily available mixtures of propylene and propane gas.

The clays preferred for use in the propylation and transpropylation reactions of the present invention are acid-activated clays of the montmorillonite type, which includes bentonite and fuller's earth. For ease of handling the clay in the reaction equipment, a clay variety exhibiting no substantial swelling properties is preferable. The clay may be obtained commercially in an activated state or may be activated by treatment with a mineral acid such as hydrochloric or sulfuric acid. A convenient process for activating the clay comprises preparing a slurry of one part by weight of clay and ten parts by weight of 5% sulfuric acid solution, and boiling this mixture for about an hour. The excess acid is then separated from the clay, first by settling and decanting, and then by wringing the clay. The "mud" thus produced is then dried and ground to a fine powder.

The presence of water in the acid-activated clay adversely affects its catalytic action and, therefore, the clay is preferably used in a dried form. The water may be removed by azeotropic distillation of a mixture of the clay with an organic liquid such as benzene, cumene, cyclohexane, toluene, or heptane. If the organic liquid used interferes with the propylation process, it should be removed prior to propylation by such means as vacuum drying. In a preferred procedure, benzene is used as the azeotroping liquid, and all or part of the benzene remaining after removal of the moisture content of the clay is incorporated directly into the reaction mixture as a reactant, along with the clay catalyst. Additional amounts of benzene and/or cumene and/or diisopropylbenzene can be added to make up the amount of starting material desired for propylation.

In general the amount of clay used will vary from about 1% to 25% of the weight of the liquid charge employed. Preferably the amount of clay is between about 1.5% and 15% by weight of the liquid charge or feed supplied for the reaction.

By the process of the present invention, a propylated reaction product can be obtained containing about 85–90% of a mixture of 1,3,5-triisopropylbenzene and 1,2,4,5-tetraisopropylbenzene, the proportion of each being about equal. The clay catalyst can be separated from the reaction product e.g. by filtration or centrifuging while the reaction product is still hot.

1,2,4,5-tetraisopropylbenzene is a crystalline solid at room temperature. It can be precipitated by cooling the above cited reaction product. Upon separating the resulting liquid and solid phases, 1,2,4,5-tetraisopropylbenzene having a purity of over 90% is obtained. The liquid phase will contain a high proportion such as about 70% of 1,3,5-triisopropylbenzene.

The 1,2,4,5-tetraisopropylbenzene in purified form, or (more slowly) in admixture with triisopropylbenzene, can be converted to 1,3,5-triisopropylbenzene in at least 75% yield in transpropylation with benzene or isopropylbenzene lower than triisopropyl.

This transpropylation is suitably effected by maintaining approximately the stoichiometric quantity of benzene, cumene, diisopropylbenzene, or mixture thereof in contact with the tetraisopropylbenzene in the presence of an acid-activated clay catalyst of the same type suitable for use in the above described propylation step, and at temperature of about 110°–170° C. The catalyst can be in the form of a suspension or a fixed bed. The transalkylation should be carried out at a temperature of about 110–170° C. to obtain satisfactory rates without excessive side reactions such as cracking.

The liquid phase separated from the precipitated tetraisopropylbenzene product of the above described propylation generally contains 70% or more of 1,3,5-triisopropylbenzene with the remainder chiefly dissolved 1,2,4,5-tetraisopropylbenzene. A little diisopropylbenzene also may be present. This liquid phase can be utilized without further treatments, or if desired, this liquid phase may be further propylated to provide an additional portion of 1,2,4,5-tetraisopropylbenzene from which high purity 1,3,5-triisopropylbenzene can be formed by the above-mentioned transpropylation procedure. If the present invention is carried out in a continuous or semi-continuous process, the liquid phase, after the 1,2,4,5-tetraisopropylbenzene crystals have been separated therefrom, can be further propylated by being recycled into the initial alkylation reaction mixture. Alternatively, the liquid phase separated in the crystallization process can be combined with the 1,3,5-triisopropylbenzene formed by the transpropylation of the tetraisopropyl product and the resulting mixture subjected to fractional distillation to obtain 1,3,5-triisopropylbenzene of very high purity.

The following examples set forth specific embodiments of various aspects of our invention and are illustrative of the best mode contemplated by us of carrying out our invention; but it is to be understood that the invention is not to be interpreted as being limited to all details of the examples. Percentages in the examples and elsewhere herein are by weight.

*Example 1*

A 100 gram quantity of Filtrol grade 1 catalyst (an acid-activated, non-swelling, bentonite-clay catalyst, produced by the Filtrol Corporation) was azeotropically dewatered with benzene for 5 hours. The water-free catalyst, containing 280 ml. of benzene was transferred to a reaction flask and 2500 ml. of cumene were added. The reaction mixture was heated with stirring and when the temperature reached 60° C., a feed of 140 liters per hour of propylene was bubbled into the reaction mixture. The propylene was fed in excess over the quantity consumed by the reaction, as observed by the escape of unreacted propylene. The temperature of the reaction mixture was allowed to rise to 135° C. and was then maintained within the range of 126–140° C. In this manner the reaction was continued for 10½ hours. During the reaction, the liquid volume expanded and 280 grams of the reaction mixture were removed to prevent overflow.

At the completion of the run, the reaction mixture was filtered free of catalyst while hot, yielding 4.05 kilograms of filtrate. Analysis of the hot filtrate by gas chromatography indicated that it contained 49.0% of 1,3,5-triisopropylbenzene, 0.9% 1,2,4-triisopropylbenzene, 42.3% of 1,2,4,5-tetraisopropylbenzene, and 7.8% of high boiling by-products.

The filtrate when cooled to room temperature precipitated a solid. Filtration yielded 1.4 kilograms of solid material containing 6.5% of 1,3,5-triisopropylbenzene, 91.0% of 1,2,4,5-tetraisopropylbenzene, and 2.5% of high boiling by-products as indicated in a solution thereof by gas chromatography. The liquid phase, as analyzed by gas chromatography, contained 71.3% 1,3,5-triisopropylbenzene, 16.8%, 1,2,4,5-tetraisopropylbenzene, and 10.6% high boiling by-products.

*Example 2*

A 100 gram quantity of catalyst as used in Example 1 was azeotropically dried with benzene for 5 hours. The dried catalyst, along with 250 grams retained benzene, was transferred to the reaction vessel and 1250 grams of benzene were added. Propylene was fed to the reaction mixture in excess, with heating and stirring, as in Example 1. The reaction was continued for 15 hours.

At the completion of the run the reaction mixture was filtered free of catalyst while hot, yielding 4,130 grams of filtrate. The analysis of the hot filtrate indicated that it contained 48.5% 1,3,5-triisopropylbenzene, 1.3% 1,2,4-triisopropylbenzene, 42.8% 1,2,4,5-tetraisopropylbenzene and 7.4% high boiling by-products.

The filtrate when cooled to room temperature precipitated a solid. Filtration yielded 1,440 grams of solid material analyzed to contain 6.7% 1,3,5-triisopropylbenzene, 90.5% 1,2,4,5-tetraisopropylbenzene, and 2.8% high boiling by-products.

*Example 3*

A 100 gram quantity of acid-activated clay catalyst as used in Example 1 was azeotropically de-watered with benzene. The benzene was decanted from the water-free catalyst and the catalyst, along with 160 grams of benzene retained therein was transferred to a reaction flask. 213 grams of cumene and 2,675 grams of the filtrate separated from the solid tetraisopropylbenzene in Example 1, were added to the reaction mixture. The reaction mixture was heated and stirred while propylene was fed into the reaction mixture in excess over that which reacted and at a rate of about 140 liters per hour. The addition of propylene in excess over that reacting was continued for 8½ hours while the temperature of the reaction mixture was maintained at about 125–136° C.

At the end of the run, the reaction mixture was filtered free of catalyst while hot, yielding 3,350 grams of filtrate. Analysis of the hot filtrate indicated that it contained 43.6% of 1,3,5-triisopropylbenzene, 1.7% of 1,2,4 - triisopropylbenzene, 43.6% of tetraisopropylbenzene, and 11.1% of high boiling by-products. The filtrate was then cooled to room temperature and a solid material containing over 90% 1,2,4,5 - tetraisopropylene was recovered.

*Example 4*

A portion of the 1,2,4,5-tetraisopropylbenzene prepared in Example 1 was mixed with cumene in a 1.0:0.5 molar ratio, and the mixture was heated to maintain the tetra compound in a dissolved state. This reaction mixture was fed through a fixed bed of azeotropically dried acid-activated clay as used in Example 1 at a temperature of 138 C. The bed was 2.2 cm. in diameter and 15 cm. high. A product was obtained which was liquid at room temperature, and which was analyzed as being 1.7% of m-diisopropylbenzene, 0.9% of p-diisopropylbenzene, 88.2% of 1,3,5-triisopropylbenzene, 3.4% of 1,2,4-triisopropylbenzene, 0.3% of 1,2,4,5 - tetraisopropylbenzene, and 5.5% of high boiling by-products.

*Example 5*

17.1 grams of azeotropically dried catalyst as used in Example 1 and 26.1 grams of benzene were added to a reaction flask. The reaction mixture was heated under stirring to 130° C. and a 247.4 gram quantity (i.e. approximately 3:1 mol ratio) of melted 1,2,4,5-tetraisopropylbenzene was added dropwise over a period of one hour. After the addition of the 1,2,4,5-tetraisopropylbenzene the reaction mixture was maintained under stirring at 130° C. for 4½ hours. By analysis, the product thus obtained contained 0.13% of benzene, 0.59% of cumene, 3.69% of meta-diisopropylbenzene, 0.03 of ortho-diisopropylbenzene, 0.32% of para-diisopropylbenzene, 86.14% of 1,3,5-triisopropylbenzene, 3.03% of 1,2,4-triisopropylbenzene, 2.59% of 1,2,4,5-tetraisopropylbenzene and 3.61% of various by-products.

It is to be understood that certain preferred embodiments of the invention have been disclosed for the purposes of illustration only, and that modifications and variations can be made without departing from the proper scope of the invention as defined by the appended claims.

We claim:

1. A process for production of 1,3,5-triisopropylbenzene, which comprises contacting 1,2,4,5-tetraisopropylbenzene as one reactant, with, as co-reactant, at least one member selected from the group consisting of benzene, cumene, and the diisopropylbenzenes at a temperature of about 110–170° C. in the presence of an acid-activated clay catalyst whereby to form 1,3,5-triisopropylbenzene by transpropylation and maintaining said contact under said conditions until at least some of said tetraisopropylbenzene and at least some of said co-reactant have been converted into 1,3,5-triisopropylbenzene.

2. The process of claim 1, wherein the reaction mixture consists essentially of said clay, 1,2,4,5-tetraisopropylbenzene and said co-reactant, the tetraisopropylbenzene and co-reactant being employed in approximately the stoichiometric proportion for formation of triisopropylbenzene.

3. A process for production of 1,3,5-triisopropylbenzene, which comprises contacting propylene with at least one isopropylbenzene of lower level of propylation than tetraisopropylbenzene at a temperature of 80–160° C. and in the presence of acid-activated clay catalyst thereby converting at least part of said isopropylbenzene to 1,2,4,5-tetraisopropylbenzene; concentrating said 1,2,4,5-tetraisopropylbenzene by crystallization; and contacting said concentrated 1,2,4,5-tetraisopropylbenzene as one reactant with, as co-reactant, at least one member selected from the group consisting of benzene, cumene, and the diisopropylbenzenes under reaction conditions including temperature of about 110–170° C. and the presence of an acid-activated clay as catalyst; providing in the reaction mixture about the stoichiometric quantities of said tetraisopropylbenzene and said co-reactant to form triisopropylbenzene by transpropylation thereof and maintaining said contact under said conditions until 1,3,5-triisopropylbenzene has been formed.

4. The process of claim 3 wherein said clay is a montmorillonite-type clay.

5. The process of claim 3, wherein said clay is bentonite.

6. A process for the preparation of 1,3,5-triisopropylbenzene comprising reacting propylene as one reactant with at least one co-reactant selected from the group consisting of benzene and cumene, with at least 3 mols of propylene being present for each mol of benzene and at least 2 mols of propylene being present for each mol of cumene, in the presence of an acid-activated clay catalyst at a temperature of about 80–160° C. to form an intermediate product containing 1,3,5-triisopropylbenzene, and 1,2,4,5-tetraisopropylbenzene; concentrating said 1,2,4,5-tetraisopropylbenzene by crystallization and converting said 1,2,4,5-tetraisopropylbenzene to 1,3,5-triisopropylbenzene by reaction with approximately stoichiometric amounts of at least one member selected from the group consisting of benzene and cumene at a temperature of about 110–170° C. in the presence of an acid-activated clay catalyst.

7. The process of claim 6 wherein said clay catalyst is a montmorillonite-type clay.

8. The process of claim 6 wherein said clay catalyst is bentonite.

9. The process of claim 6 wherein said propylene is reacted with said co-reactant at a temperature of about 105–140° C.

References Cited by the Examiner

UNITED STATES PATENTS

| | | | |
|---|---|---|---|
| 2,385,524 | 9/1945 | Mattox | 260—672 |
| 2,415,272 | 2/1947 | Benedict et al. | 260—672 |
| 2,795,630 | 6/1957 | Lien et al. | 260—672 |

DELBERT E. GANTZ, *Primary Examiner.*

C. R. DAVIS, *Assistant Examiner.*